April 18, 1961 R. D. HOFFMAN 2,980,058
ANIMAL COT WITH ELECTRICALLY HEATED PAD
Filed March 3, 1959 2 Sheets-Sheet 1

Roy D. Hoffman
INVENTOR.

BY Clarence A. O'Brien
and Harvey B. Jacobson
Attorneys

April 18, 1961   R. D. HOFFMAN   2,980,058
ANIMAL COT WITH ELECTRICALLY HEATED PAD
Filed March 3, 1959   2 Sheets-Sheet 2
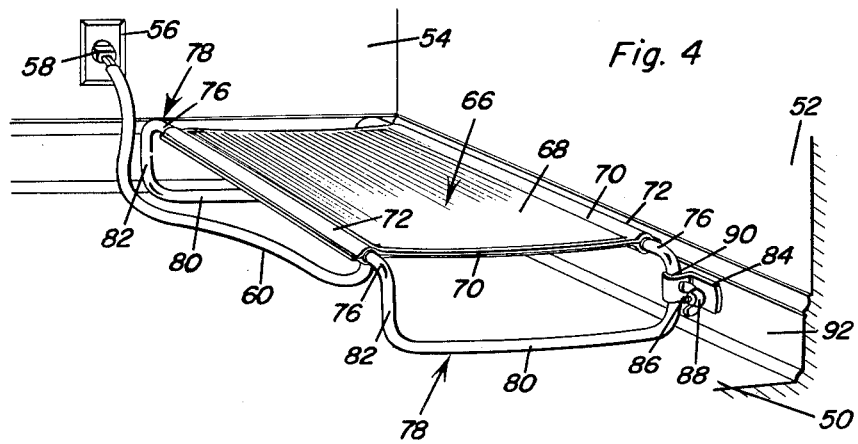
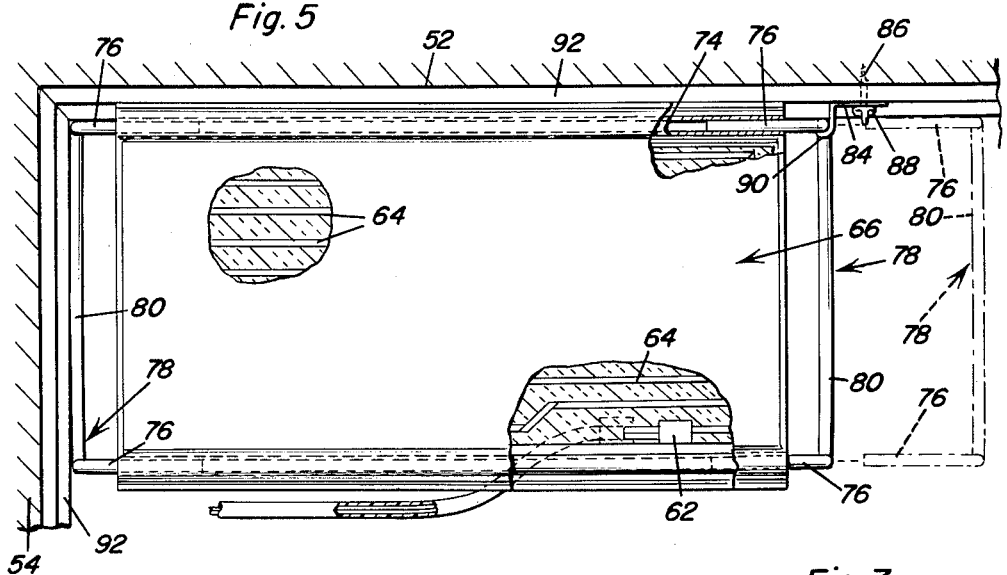
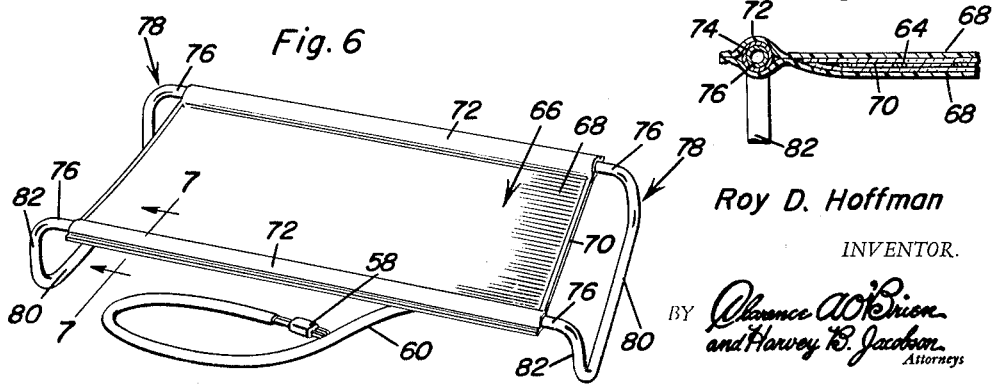
Roy D. Hoffman
INVENTOR.

United States Patent Office 2,980,058
Patented Apr. 18, 1961

2,980,058
ANIMAL COT WITH ELECTRICALLY HEATED PAD
Roy D. Hoffman, 325 S. Richard St., Bedford, Pa.
Filed Mar. 3, 1959, Ser. No. 796,820
6 Claims. (Cl. 119—1)

This invention relates to facilities for treatment and care of animal pets such as dogs, cats, and the like; and pertains to a cot and, in addition, to the associated quarters in which the cot may be installed for diversified use. As to the cot, it is a self-contained innovation as will be hereinafter evident; and in respect to the "quarters" reference is here being made to an animal cage, a kennel with one or more cages, or any room or place in the pet owner's home where the animal (or animals) usually stays, particularly when sleeping or for other reasons of confinement, for example, when recuperating after surgery.

With respect to the cot or bed, this aspect of the concept has to do not only with the over-all or self-contained portable knockdown construction, but especially to the part thereof which will be referred to herein as a "pallet" for the reason that it may be used with or without the frame structure and anchoring or retaining means for said frame structure. That is to say, the pallet need not necessarily be construed as suspended on the anchored frame structure for there may be times when it will be placed for use on the floor or some support means other than the frame structure. This is so because the pallet is in and of itself a cot in that it comprises, briefly, a water-proof and otherwise suitably constructed jacket containing a sealed-in thermostatically controlled electric pad, thus providing a washable and serviceable unit suitable to the needs of a pet and the owner too.

With a view toward enabling the reader to evaluate the meritorious nature of the over-all concept it may be properly said here that many animal cages, those used for example in kennels, are for the most part without drainage and disposal facilities and are extremely difficult to work in and keep clean. Where a dog is being boarded and is confined in his quarters it is the practice of attendants to install a makeshift seat. This seat is often a box or the like, in fact anything that might be available for the confined dog to sit on and elevate himself above an unclean and often wet floor. As is well known where a dog finds the bottom or floor of his quarters wet and otherwise undesirable, he cannot lie down so he will take refuge on a box or whatever seat may be available. It follows that usually the special facilities offered by your applicant include drainage facilities (not here shown). It is then possible to "hose out" the quarters particularly when the "patient" has been operated on or is otherwise ill and being attended to. In fact, it was because of these briefly stated conditions that your applicant was inspired to promote the use of better and more acceptable quartering facilities for pets and animals. In fact, these needs for sanitation and proper care and treatment gave rise to the adoption and use of a cage used as a recuperating room after surgery and wherein the cot or bed is anchored against displacement, enables the animal to get up off the floor and, in addition promotes easing and comfort by reason of the fact that the cover or pallet for the frame is a readily attachable and detachable heating pad as well as a pallet.

It will be understood, however, that the invention, as already touched upon, is not to be limited to the cot in combination with the quarters but has to do, and this perhaps even more important, with the cot or bed itself. In this connection novelty is predicated on the adoption and use of a frame including leg support rails, supporting legs either front or back or at both ends for the frame, and the readily applicable and removable pallet preferably one which is a tough plastic jacket or cover which envelops the automatically controlled sealed-in heating pad.

More specifically novelty is predicated on a cot for an animal pet characterized by a portable knockdown type frame embodying a pair of hollow side rails, end portions of said rails constituting sockets, a pallet removably suspended between said rails, said pallet having a washable cover suitable to use by a dog or cat, as the case may be, and at least one leg unit for said rails, said unit having supporting legs and also embodying lateral assembling and connecting members fitting telescopingly and removably into the cooperating sockets provided therefor.

Other objects, features and advantages will become more readily apparent from following the description and the accompanying illustrative, but not restricted, drawings.

In the drawings wherein like numerals are employed to designate like parts throughout the views:

Fig. 4 is a perspective view which shows the cot, that is, a modified form of the same, said cot being installed in a room in one's home where the pet usually stays.

Fig. 5 is a horizontal section with portions broken away and shown in section and illustrating certain structural features of the invention.

Fig. 6 is a perspective view of the cot of Fig. 4 by itself.

Fig. 7 is a section on the plane of the line 7—7 of Fig. 6.

It should be pointed out here, before introducing the description of the details, that the instant application is a continuation-in-part of my co-pending application Serial No. 703,928 filed December 19, 1957, now Patent No. 2,900,956.

Figure 1:
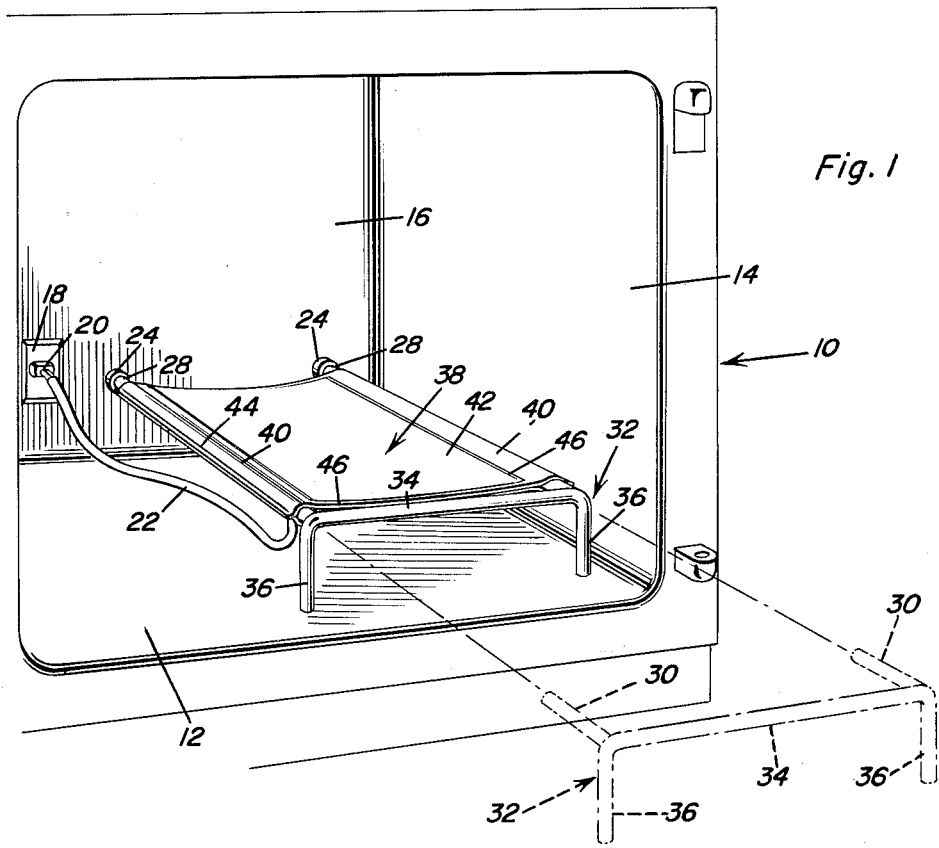
Fig. 1 is a perspective view showing one embodiment of the invention which has to do with at least one cage containing the insertable and removable cot wherein the pallet portion thereof embodies an electrically heated pad.
Figure 2:
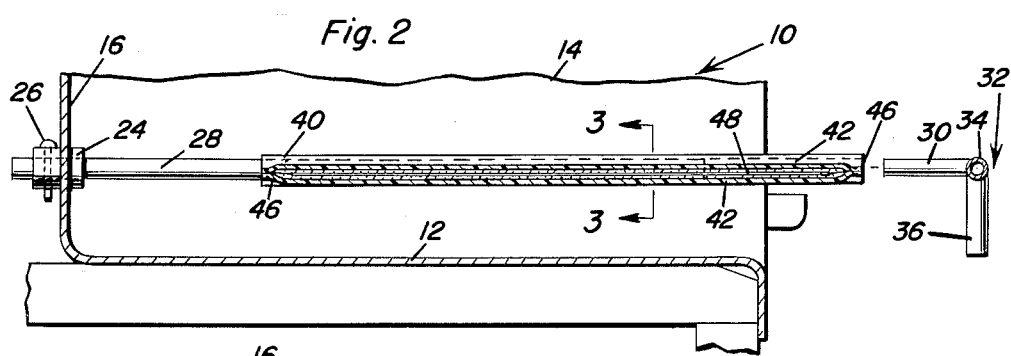
Fig. 2 is a view in section and elevation which is in effect a lengthwise section showing the front leg means detached and the cover or pallet in the process of being either removed or replaced as the case may be.
Figure 3:
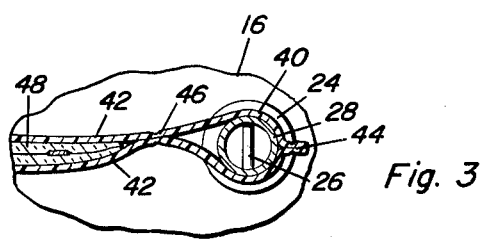
Fig. 3 is an exaggerated section on the line 3—3 of Fig. 2, looking in the direction of the arrows.

With reference to Figs. 1 to 3 the numeral 10 designates an enclosure which may be designated as a cage, a compartment, or perhaps even a kennel. The one shown is primarily the type used in kennels where dogs are boarded and otherwise treated and taken care of. The floor is denoted at 12, one vertical side wall at 14 and the rear wall at 16. The numeral 18 designates an electrical outlet to accommodate a plug 20 on an electric cord or conductor 22. As seen in Fig. 2 holes are provided through the rear wall 16 to accommodate sleeves 24 which serve as socket members and they are suitably fixed in place with the rear end portion exposed to accommodate a cotter key, pin or the like 26.

The portable knock-down animal cot is of a miniature type as shown and comprises a pair of tubular side rails 28. The left hand end portions of Fig. 2 are shown removably supported and anchored in the socket members or sleeves 24. The other open end portions of the tubes serve as sockets which in the embodiment shown serve to accommodate the attaching extensions 30 carried by the inverted U-shaped leg frame 32. The bight portion is denoted at 34 and the legs or limbs at 36. This leg frame 32 is made readily applicable and removable so that the cover or pallet 38 may be readily applied and removed for obvious purposes. To assist in mounting the pallet it is provided along longitudinal edges with open-ended pockets or hems 40 fitting over the side rails 28. As already pointed out the cover is made up of sheet plastic material of suitable toughness to withstand clawing, scratching and a certain amount of biting with teeth. In Fig. 3 the jacket is shown made of sheets of plastic material 42 which have marginal edges seamed together as at 44. As a matter of fact, portions of the sheet inwardly of the rail are also seamed together at 46 thus providing a waterproofed pocket which contains the electric heating pad 48. The covering and pad constitute a self-contained or readily washable unit. The electric cord 22 is suitably connected with thermostatic control means in the pad which keeps the pad within the limits of a normal top temperature, a temperature which veternarians have found to be proper for a heated pad and pallet of the type shown and described.

The obvious purpose of Fig. 4 is to bring out the fact that the invention is not to be limited to a cage or kennel 10. As a matter of fact the invention is not to be limited to the combination of the cage and cot but to the components singly and collectively. In any event, Fig. 4 shows the other form of the cot used in a room of one's home. For this reason Fig. 4 shows a floor 50, a wall 52 and an adjacent wall 54, the wall 54 having an outlet 56 to accommodate the plug 58 on the electric cord or conductor 60. The conductor 60 is shown connected to a thermal control element 62. The electric wires or elements in the pad are denoted at 64. Here again the pallet or cot is denoted as an entity by the numeral 66 and the plastic or equivalent waterproof laminations or sheets 68 are marginally sealed together to provide an efficient effective envelope or enclosure for the electric pad 70 (Fig. 7). Also, the desired pockets or hems 72 are provided so that the pallet may be applied and removed. Here the side rails are metal tubes 74 which, as shown in Fig. 5, utilize their own end portions to provide sockets for reception of the attaching extensions or arms 76 which are parts of the U-shaped leg frame 78 at either end. Here the bight portion is denoted at 80 and the legs at 82. The simplified means for holding this cot in usable position is the bracket shown at the right in Fig. 4. The bracket comprises an attaching lug 84 mounted on a stud 86 held in place by a thumb nut 88, said lug having an offset or suitably shaped clip 90 to releasably engage the adjacent leg of the leg frame 78 to in this manner fasten the cot to the floorboard 92.

It is to be pointed out that while it is not necessarily shown here the entire pallet or cot is capable of having a cloth jacket provided thereover, that is a jacket made from Turkish towel material. This could be readily applied and removed and this means too that it would be within the purview of the invention to have the encased heating pad a permanent part of the frame structure since the frame structure can be removed and the essential parts subjected to washing and cleaning.

It is perhaps unnecessary to add that the disclosure provides facilities singly and collectively which offer pets suitable enclosures and warm bed means. For the purpose of handling puppies, kittens and the like the invention is ideal as pet owners will full well appreciate. Since, it is not the purpose of this technical paper to dwell upon the commercial aspects it is believed that the disclosure given is sufficient to cover the construction and the arrangement and to provide a basis for the invention as hereinafter claimed.

Minor changes in shape, size, materials, and rearrangement of components may be resorted to in actual practice without departing from the spirit of the invention or the scope of the invention as claimed.

What is claimed as new is as follows:

1. A cot for animal pets comprising a pair of spaced substantially parallel rail members having sockets at their respective outer ends, a readily applicable and removable flexible cover having lengthwise hems providing rail receiving pockets along two opposite edges and embracing said rail members, said cover also having a single central pocket, a thermostatically controlled heating element mounted for operation in said central pocket, support means for the rails having cooperating components engaged movably in their respective sockets, said support means serving to elevate the rails and consequently said cover above a supporting surface, and a suitable electric cord having one end connected to said heating element through the bottom of said central pocket.

2. The combination of claim 1 and wherein said connected one end is spaced from transverse end portions of the cot and spaced inwardly from median portions of said rails whereby it is conveniently and safely out of reach of the animal occupying the cot.

3. The combination of claim 1 and wherein the end of the cord which is connected to said heating element element through said bottom is situated in the space between median portions of said rails and is sufficiently far from said median portions that the pet occupying the cot cannot reach over either rail and tamper with the connected cord end.

4. A cot for animal pets comprising a heating pad having a thermostatically controlled heating element incorporated therein, a waterproof washable cover completely enveloping said heated pad, said cover being such that it can withstand damage from the animal's claws and teeth and being of material not injurious to the animal if chewed and swallowed, the lengthwise edges of said cover being provided with open ended hems, a portable knockdown type cot frame having spaced rails and at least one leg frame, said hems providing pockets removably receiving said rails, said leg frame having component portions separably joined to cooperating end portions of the respective cooperating rails making it possible to readily apply and remove the heating pad, and a suitable electric cord having one end connected to said heating element, said heating element being located at the bottom of the cover where it and the connected end of the cord is safely isolated and not accessible to the animal when occupying the cot.

5. An animal cot comprising spaced parallel tubular side rails, the respective open end portions of said rails constituting sockets, a flexible cover provided along opposite longitudinal edges with open-ended hems providing pockets, said rails fitting removably into their respective pockets, said cover having a central pocket, a thermostatically controlled heating element mounted in said pocket and provided with an electric cord, the cooperating end of said cord being connected to said heating element and extending through the bottom of the cover, support means having legs adapted to rest on the floor, said support means having component members fitting removably into said sockets and thus allowing the cover to be manually applied and removed, said cover being made of launderable sheet material and said thermostatically controlled heating element and the end of the cord connected thereto being sealed in place against water damage when the cover is subjected to cleansing by washing.

6. For use on a portable knockdown supporting frame, an animal cot embodying a flexible cover having longitudinal edge portions provided with attaching and retaining pockets, said cover adapted for attachment to the cooperating frame members, said cover having a central pocket with a thermostatically controlled heating element in said central pocket, and a suitable electric cord having one end connected to the heating element and extending through a bottom side of said central pocket, said element and connected cord end being spaced inwardly from marginal edge portions of the over-all cover and assuming a substantially inaccessible position when being used by an animal.

References Cited in the file of this patent

UNITED STATES PATENTS

| | | | |
|---|---|---|---|
| 614,008 | King | Nov. 8, | 1898 |
| 669,175 | Lein | Mar. 5, | 1901 |
| 1,065,422 | Youngblood | June 24, | 1913 |
| 1,820,284 | Mills | Aug. 25, | 1931 |
| 2,009,758 | Blatchford | July 30, | 1935 |
| 2,128,415 | Hills | Aug. 30, | 1938 |
| 2,280,779 | Barragy | Apr. 28, | 1942 |
| 2,376,902 | Clark | May 29, | 1945 |
| 2,821,165 | Wright | Jan. 28, | 1958 |
| 2,873,352 | Franco | Feb. 10, | 1959 |
| 2,900,956 | Hoffman | Aug. 25, | 1959 |